US008473846B2

(12) United States Patent
Ubillos et al.

(10) Patent No.: US 8,473,846 B2
(45) Date of Patent: Jun. 25, 2013

(54) ANCHOR POINT IN MEDIA

(75) Inventors: Randy Ubillos, Los Altos, CA (US); Mike Marinkovich, Santa Clara, CA (US); Greg Lindley, Sunnyvale, CA (US); Alan Cannistraro, San Francisco, CA (US); Evan Doll, San Francisco, CA (US); Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1003 days.

(21) Appl. No.: 11/760,725

(22) Filed: Jun. 8, 2007

(65) Prior Publication Data

US 2008/0155420 A1 Jun. 26, 2008

Related U.S. Application Data

(60) Provisional application No. 60/871,751, filed on Dec. 22, 2006.

(51) Int. Cl.
*G06F 3/00* (2006.01)
*G06F 3/01* (2006.01)

(52) U.S. Cl.
USPC ............ 715/723; 715/716; 715/719; 715/720

(58) Field of Classification Search
USPC ................. 715/716, 719, 720, 723, 724, 727, 715/728, 866
See application file for complete search history.

(56) References Cited

U.S. PATENT DOCUMENTS

| | | | |
|---|---|---|---|
| 5,359,712 A * | 10/1994 | Cohen et al. ................ 715/723 |
| 5,781,188 A * | 7/1998 | Amiot et al. ................ 715/723 |
| 5,786,814 A * | 7/1998 | Moran et al. ................ 715/720 |
| 5,880,722 A | 3/1999 | Brewer et al. |
| 5,886,692 A * | 3/1999 | Brewer et al. ................ 715/723 |
| 5,892,506 A * | 4/1999 | Hermanson ................ 715/202 |
| 5,982,350 A * | 11/1999 | Hekmatpour et al. ........ 345/629 |
| 5,999,173 A * | 12/1999 | Ubillos ........................ 715/724 |
| 6,031,529 A * | 2/2000 | Migos et al. .................. 715/783 |
| 6,204,840 B1 * | 3/2001 | Petelycky et al. ............. 715/202 |
| 6,249,316 B1 | 6/2001 | Anderson |
| 6,545,687 B2 | 4/2003 | Scott et al. |
| 6,700,612 B1 | 3/2004 | Anderson et al. |
| 6,734,909 B1 | 5/2004 | Terane et al. |
| 6,807,361 B1 * | 10/2004 | Girgensohn et al. ........... 386/52 |
| 6,912,327 B1 | 6/2005 | Hori et al. |
| 6,919,910 B2 | 7/2005 | Chang |
| 7,062,713 B2 * | 6/2006 | Schriever et al. ............ 715/723 |
| 7,434,155 B2 * | 10/2008 | Lee ............................... 715/203 |
| 7,474,698 B2 * | 1/2009 | Pan et al. ................. 375/240.08 |
| 7,509,569 B2 * | 3/2009 | Barrus et al. ................. 715/200 |
| 7,546,532 B1 * | 6/2009 | Nichols et al. ............... 715/716 |
| 7,614,012 B1 * | 11/2009 | Dulaney ....................... 715/838 |
| 7,623,755 B2 * | 11/2009 | Kuspa ........................... 386/55 |
| 7,653,550 B2 * | 1/2010 | Schulz ......................... 704/278 |
| 2003/0052906 A1 * | 3/2003 | Lau et al. .................... 345/700 |
| 2003/0090504 A1 * | 5/2003 | Brook et al. ................. 345/716 |
| 2003/0189588 A1 * | 10/2003 | Girgensohn et al. ......... 345/723 |
| 2003/0215214 A1 * | 11/2003 | Ma .................................. 386/52 |
| 2005/0069283 A1 * | 3/2005 | Mitsuyu ......................... 386/46 |
| 2006/0224940 A1 * | 10/2006 | Lee ............................ 715/500.1 |
| 2006/0224993 A1 | 10/2006 | Wong et al. |
| 2007/0223878 A1 | 9/2007 | Abe et al. |

* cited by examiner

*Primary Examiner* — Nicholas Augustine
(74) *Attorney, Agent, or Firm* — Schwegman Lundberg & Woessner, P.A.

(57) ABSTRACT

A computer-implemented method includes displaying, within a user interface in a digital media system, a project pane, displaying video content within the project pane, the video content aligned relative to a time line, adding overlay content to the video content, and anchoring a first position in the overlay content to a second position in the video content such that content corresponding to the first position is synchronized to content corresponding to the second position.

21 Claims, 13 Drawing Sheets

ANCHOR POINT IN MEDIA

CROSS REFERENCE TO RELATED APPLICATION

This application claims the benefit of the filing date of U.S. Provisional Application Ser. No. 60/871,751, filed on Dec. 22, 2006, and entitled "Anchor Point In Media", the entire disclosure of which is incorporated herein by reference.

TECHNICAL FIELD

In general, this document describes systems and techniques for editing video clips using video editing software.

BACKGROUND

Scenes in motion can be captured and recorded using a variety of devices ranging from state-of-the-art professional video cameras used in television and movie-making to simple cameras on cellular telephones. Some of the devices that can be used to capture motion pictures, including digital camcorders and digital cameras, also allow storing the captured images in digital format including the moving picture experts group. (MPEG) format. Depending on device capabilities and user settings, a camera can capture and store both audio and video. The recorded information is automatically stored in digital format and can be easily transported to secondary devices including hard disks in computers using various wired or wireless communications protocols such as bluetooth or universal serial bus (USB) based devices.

Video editing software, such as iMovie HD 6.0.1, provides a user in possession of a large repository of video clips with non-linear editing techniques to edit raw footage. Such editing includes cutting segments of the footage, re-arranging segments of the same video clip, re-arranging and combining segments of multiple video clips, and modifying the content by adding content including audio tracks, voice-overs, titles, and transitions between frames. Software manufacturers regularly add features to the software so that the software is simple to operate for an average user, while providing a near-professional quality to the finished video.

SUMMARY

In one example, based on user input, a system can upload a library of video clips, display the video clips as a series of thumbnails in a user interface, provide previews of specific time instants in a video clip, and allow a user to edit the content of video clips displayed in the user interface.

In one implementation, a computer-implemented method is described. The method includes displaying, within a user interface in a digital media system, a project pane, displaying video content within the project pane, the video content aligned relative to a time line, adding overlay content to the video content, and anchoring a first position in the overlay content to a second position in the video content such that content corresponding to the first position is synchronized to content corresponding to the second position.

This and other aspects can include one or more of the following features. Anchoring can cause a first content corresponding to the first position to play back at an instant when a second content corresponding to the second position plays back, regardless of the instant in the time line when the second content plays back. Anchoring can cause a first content corresponding to the first position to play back at an instant when a second content corresponding to the second position plays back, regardless of the editing operations performed to the video content. The editing operations include removing a portion of the video content, adding new video content, and re-arranging a sequence of the video content. The first position can be moved based on user input. The second position can be moved based on user input. Adding the overlay content to the video content can automatically synchronize the starting position of the overlay content to the starting position of the video content. Moving the first position from the starting position to a new position can cause the overlay content to be overlay content to be automatically adjusted to play back the new position when the second position is played back. The overlay content can include one or more of an audio track, a title, a voice-over, and a transition between frames in the video content. The overlay content can be displayed as a vertical bar adjacent to the video content. The first position and the second position can be displayed as a first point and a second point, respectively, connected by a vertical line.

In another implementation, a medium bearing instructions to enable one or more machines to perform operations is described. The operations include displaying, within a user interface in a digital media system, a project pane, displaying video content within the project pane, the video content aligned relative to a time line, adding overlay content to the video content, and anchoring a first position in the overlay content to a second position in the video content such that content corresponding to the first position is synchronized to content corresponding to the second position.

This and other aspects can include one or more of the following features. Anchoring can cause a first content corresponding to the first position to play back at an instant when a second content corresponding to the second position plays back, regardless of the instant in the time line when the second content plays back. Anchoring can cause a first content corresponding to the first position to play back at an instant when a second content corresponding to the second position plays back, regardless of the editing operations performed to the video content. The editing operations include removing a portion of the video content, adding new video content, and re-arranging a sequence of the video content. The first position can be moved based on user input. The second position can be moved based on user input. Adding the overlay content to the video content can automatically synchronize the starting position of the overlay content to the starting position of the video content. Moving the first position from the starting position to a new position can cause the overlay content to be overlay content to be automatically adjusted to play back the new position when the second position is played back. The overlay content can include one or more of an audio track, a title, a voice-over, and a transition between frames in the video content. The overlay content can be displayed as a vertical bar adjacent to the video content. The first position and the second position can be displayed as a first point and a second point, respectively, connected by a vertical line.

The systems and techniques described here may provide one or more of the following advantages. First, the video clips in a video library can be viewed as rows of horizontal thumbnails, where a thumbnail can represent all or portion of a time period of the video clip. The thumbnails are wrapped within the viewable window of the user interface to avoid horizontal scrolling within the window to access segments of the video clip. The video clips appear to a user in the form of a two-dimensional time line. Second, a frame corresponding to a time instant in a video clip can be previewed by simply placing a cursor on a display device operated by a pointing device, such as a mouse, at a desired position on a thumbnail related to the video clip. In a system where the pointing device is a mouse, multiple frames in a video clip can be previewed by a simple mouse over without the need to click the mouse at any point on the user interface. In selecting segments of video during editing, a user can use this feature to determine start and stop points in the video clip. Third, a segment of desired length can be chosen from a video clip and isolated from the remainder of the video clip for use in editing. In a manner similar to selecting text in a text editor, a user can select one or more desired segments of a video clip. Subsequently, the user can transfer the one or more selected segments to a separate portion of the user interface to edit the content of the segments. The selected segments can be transferred using a pointing device, such as a mouse, without the need to click the mouse at any point in the selected segment. Fourth, a user can anchor a specific point in additional content overlaid on recorded video, including audio tracks, voice-overs, titles, and transitions between frames, to a specific point in the content of the video clip. In this manner, the user can synchronize the start time of playback of the overlay content to the content of the video clip regardless of additions to or deletions from the video clip. The user may be assured that once overlay content has been anchored at a desired position, such content will always playback in the finished video clip at the anchored position regardless of other modifications that the user may perform on the video clip.

In addition, the system can simplify the video editing process and make it user-friendly. Since the tediousness involved in editing is significantly reduced, a user is encouraged to perform improved editing operations on the video content. The quality of the finished video and the confidence of the user in video editing can simultaneously be improved.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
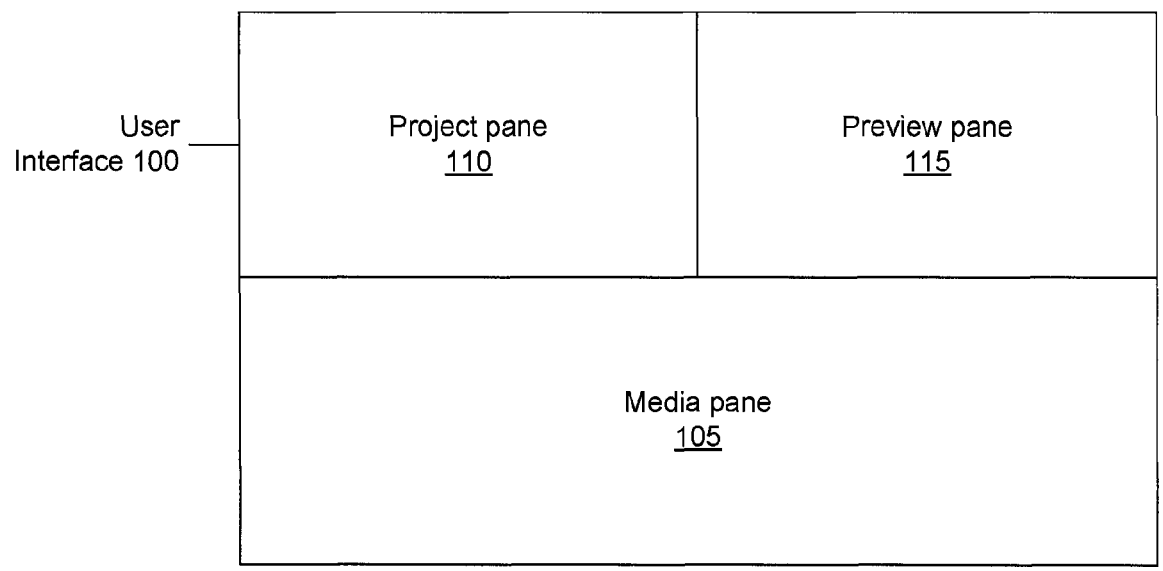
FIG. 1 is an example of a schematic of a user interface to perform video editing.

FIG. 1 depicts an example of a schematic of a user interface 100 to perform video editing. The user interface 100 includes a media pane 105, a project pane 110, and a preview pane 115. Video clips containing raw footage recorded using a recording instrument are uploaded into the user interface 100 and displayed in the media pane 105. In some implementations, the video clips containing raw footage may be stored on a storage device such as a video library. When the user interface is opened, the system can display the available video libraries in a pane adjacent to the media pane 105. In other implementations, when the user interface is opened, the system can automatically search the storage device for video clips and display all available video clips in the media pane 105. In other implementations, the system can retrieve stored video clips based on user input. All video clips selected by the user can be uploaded into the user interface 100 and displayed in the media pane 105 regardless of the type of the video clip or the recording instrument. The video clips can be recorded using any recording instrument including digital camcorders, digital cameras, and cellular telephones. The video clips can be stored in any format including quicktime, mpeg-1, mpeg-2, AVI, and real video. In addition, the time period of each video clip can be displayed on or adjacent to a corresponding video clip.

The project pane 110 includes one or more segments from one or more of the video clips displayed in the media pane 105 that can be selected by the user for editing. When segments are selected and transferred from the media pane 105 to the project pane 110, a project is automatically created. In some implementations, a pane displaying projects can be displayed adjacent to the project pane 110. Subsequent to editing, the contents of a project pane 110 can be saved as a finished project. A finished project can be saved in any format including quicktime, AVI, mpeg-1, mpeg-2, and real, regardless of the format of the video from which each segment in the project was obtained. A saved project can be re-opened for further editing. In addition, the project pane 105 can also include representations to indicate additional content including audio tracks, voice-overs, titles, and transitions between frames.

Video in a video clip is stored as a sequence of frames. The preview pane 115 displays frames, wherein a frame is one of the plurality of photographic images in a motion picture. A frame displayed in the preview pane 115 corresponds to a time instant in the video clip. The preview pane 115 can display frames corresponding to content displayed in the media pane 105 and content displayed in the project pane 110. In addition, the preview pane 115 plays back video content displayed in the media pane 105 and in the project pane 110, based on user input. Based on system capabilities, the content played back in the preview pane 115 can include audio content recorded along with the video content or added to the raw footage. A user can preview the effect of editing the video content in the preview pane 115.

In some implementations, the width of the media pane 105 is equal to the sum of the widths of the project pane 110 and the preview pane 115. The height of the three panes can be equal to one another. A user can alter the dimensions of the panes within the limits of the dimensions of a display device on which the user interface 100 is displayed. The dimensions of the user interface 100 can also be altered within the limits of the display device causing the dimensions of the panes to change proportionally.

In some implementations, the media pane 105 can be displayed in the bottom half of the user interface 100 and the project pane 110 and the preview pane 115 can be displayed in the top half. Alternatively, the media pane 105 can be displayed in the top half and the project pane 110 can be displayed in the bottom half. The positions of the media pane 105 and the project pane 110 within the user interface 100 can be switched in a single operation. For example, the media pane 105 may display video clips from the video library. The project pane 110 may display segments from one or more video clips selected by the user. The preview pane 115 may display a frame corresponding to a time instant determined by the position of the cursor on the display device. Upon receiving input from a user, in a one-step operation, the positions of the media pane 105 and the project pane 110 can be simultaneously swapped while retaining the content displayed in the media pane 105 and the project pane 110.

Figure 2A:
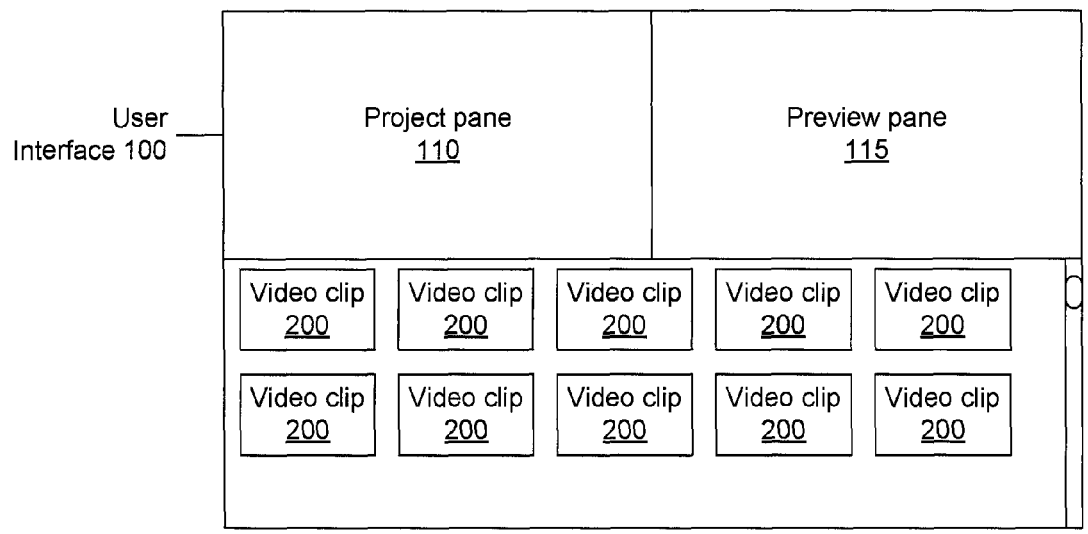
FIG. 2A is an example of a schematic of a user interface displaying each video clip as a thumbnail.

FIG. 2A depicts an example of a schematic of a user interface 100 displaying each video clip 200 as a thumbnail. A video clip 200 includes the content recorded by a recording instrument from the instant the recording feature is turned on to the instant the recording feature is turned off. When the video clips 200 in a video library are uploaded into the user interface 100, each video clip 200 is displayed as one or more rows of rectangular thumbnails. The time line of a video clip 200 runs from left to right and top to bottom. In some implementations, each video clip 200 can be represented by a single rectangular thumbnail with a system defined distance separating each thumbnail to distinguish between video clips. Thumbnails are displayed in a first row until the sum of the widths of the thumbnails exceed the width of the media pane 105 displayed. Subsequent thumbnails are wrapped to the next row in the media pane 105. A gutter, which is a system designated space, separates two rows of thumbnails.

Figure 2B:
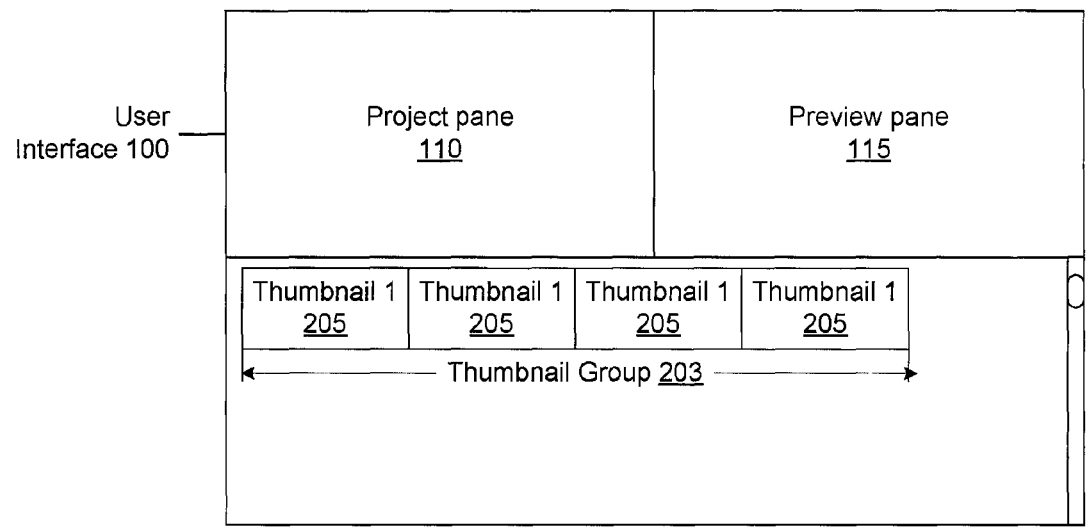
FIG. 2B is an example of a schematic of a user interface displaying a video clip as a thumbnail group.

FIG. 2B depicts an example of a schematic of a user interface 100 displaying a video clip 200 as a thumbnail group 203. The thumbnail group 203 collectively representing the video clip is displayed as a continuous sequence of one or more rectangular thumbnails 205. The vertical and horizontal dimensions of each thumbnail 205 are designated by the system. Each video clip 200 is collectively represented by a thumbnail group 203. Each thumbnail group 203 can include one or more thumbnails 205. Thumbnails 205 related to the same thumbnail group 203 are displayed as a continuous sequence. Thumbnail groups 203 corresponding to separate video clips are displayed such that the last thumbnail 205 of a thumbnail group 203 is separated from the first thumbnail 205 of the subsequent thumbnail group 203. The order of display of the thumbnails in the thumbnail group corresponds to the order in which the corresponding video clip was captured. Progression of time corresponds to positioning of the thumbnails going from left to right in the horizontal direction and top to bottom in the vertical direction. A video clip 200 can be included to or removed from display in the user interface 100 based on user input. When a thumbnail group 203 corresponding to a video clip 200 is hidden, then the remaining thumbnail groups 203 are re-arranged to fill the gaps corresponding to the hidden thumbnail group 203. In this manner, the thumbnail groups 203 are displayed in a manner analogous to words in a word processing application user interface.

Each thumbnail 205 is assigned a portion of the time period of video content in the video clip 200. The duration of a video clip 200 is divided by the time period assigned to each thumbnail 205. In this manner, the number of thumbnails 205 in a thumbnail group 203 required to display the video clip 200 is determined. The duration of a video clip 200 may be exactly divisible by the time period assigned to each thumbnail 205 with no remaining time. In such cases, when the duration of the video clip 200 is divided by the time assigned to each thumbnail 205, the number of thumbnails 205 in a thumbnail group 203 required to display the video clip 200 equals the quotient of division (Q) with no time remaining. The video clip 200 is displayed across Q thumbnails 205 in the thumbnail group 203. Alternatively, there may be time remaining after dividing the total time period of the video clip 200 by the time period assigned to each thumbnail 205. In such cases, the number of thumbnails 205 in the thumbnail group 203 required to display the video clip 200 equals the quotient of the division (Q) plus one. The video clip 200 is displayed across (Q+1) thumbnails 205 in the thumbnail group 203. Also, in such cases, the time period corresponding to the last thumbnail 205 in the thumbnail group 203 is less than that corresponding to the other thumbnails 205 in the thumbnail group 203. Nevertheless, the dimensions of all the thumbnails 205 in the thumbnail group 203 related to a video clip 400 are equal to one another. The segment of the last thumbnail 205 of the video clip 200 containing no video content is filled with a color, for example, grey, when the cursor on the display device is placed on the thumbnail. In this manner, a user can readily discern that the filled segment of the last thumbnail 205 of a thumbnail group 203 is void of any video content. The segment of the thumbnail 205 void of content is not used during editing. The aesthetics of the user interface 100 are improved by keeping equal the dimensions of all the thumbnails 205 in the thumbnail group 203 and avoiding the display of fractionated thumbnails 205 to represent content of shorter time periods.

In some implementations, where the time period of the content in the last thumbnail is less than the time period of the other thumbnails in the thumbnail group, the content of the last thumbnail in the thumbnail group is distributed across the entire dimension of the thumbnail. In such implementations, despite a mismatch in the time period of content in the last thumbnail and the remaining thumbnails in the same thumbnail group, each point in the physical space occupied by a thumbnail corresponds to a frame in the media item. In other implementations, where the time period of the content in the last thumbnail is less than the time period of the other thumbnails in the thumbnail group, the dimensions of the last thumbnail can be truncated to indicate the reduced time period.

A user can alter the time period assigned to the thumbnails 205 in the user interface 100. The thumbnails 205 in the project pane 110 can be assigned a different time period than the thumbnails 205 in the media pane 105. In some implementations, a first interactive scale and a second interactive scale are displayed adjacent to the media pane 105 and the project pane 110, respectively. The scales are operatively coupled to the respective panes such that the time assigned to thumbnails in the media pane 105 and that assigned to the thumbnails in the project pane 110 can be independently altered by sliding the first scale and the second scale, respectively. In some implementations, the time period corresponding to each thumbnail 205 is assigned by the system. In other implementations, the time period corresponding to each thumbnail 205 is specified by the user. In other implementations, when a video clip 200 is first loaded into the media pane 105, each thumbnail 205 is assigned a time period that is equal to a system default value. A user can alter this value to a user-defined value within limits specified by the system.

The vertical and horizontal dimensions of the thumbnails 205 are uniform and are designated by the system. The dimensions of the media pane 105 and the project pane 110 may be insufficient to display all the thumbnails 405 related to one or more thumbnail groups 203 in the same row. In some implementations, an interactive scale is displayed adjacent to the media pane 105 and the project pane 110. The scale is operatively coupled to the dimensions of the thumbnails in the media pane 105 and the project pane 110. A user can change the position of the scale to increase or decrease the size of the thumbnails 205 in the media pane 105 and the project pane 110. In this manner, the size of the thumbnails 205 displayed in the media pane 105 and the project pane 110 can be simultaneously altered. In other implementations, the size of the media pane 105 is automatically increased to accommodate all thumbnails 205 by adding rows. Nevertheless, the dimensions of the media pane 105 displayed remain unaltered. A vertical scroll bar is incorporated into the media pane 105 so that the user may scroll vertically to access video clips 200 that are not immediately viewed. In other implementations, the user can pan the media pane 105 using the pointing device or the keyboard or both. The size of display of the thumbnails 205 can also be altered by a combination of resizing thumbnails using an interactive scale and increasing the size of the media pane 105.

Figure 3:
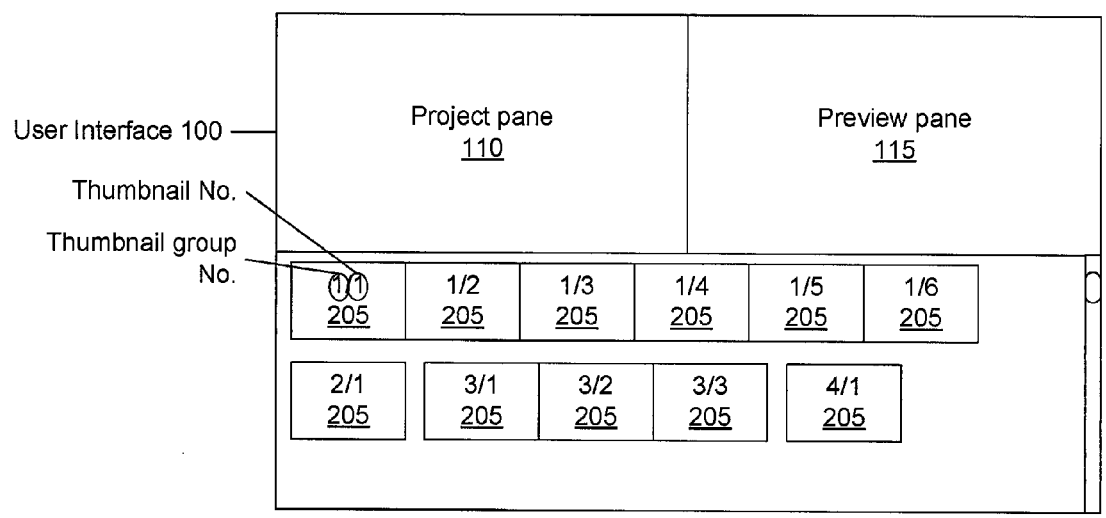
FIG. 3 is an example of a schematic of a user interface displaying a plurality of video clips as corresponding thumbnail groups.
Figure 4A:
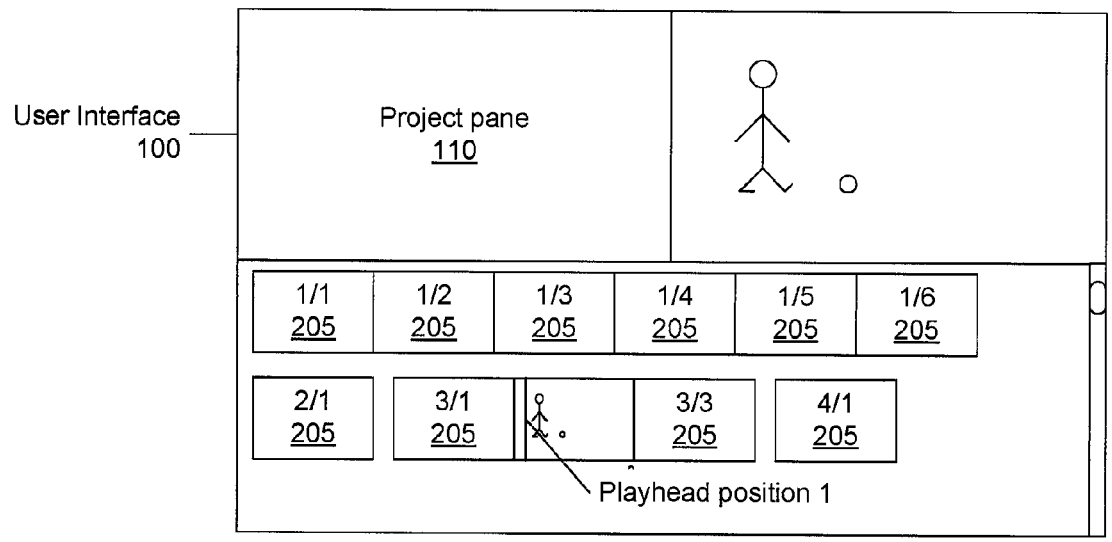
FIG. 4A is an example of a schematic of a first frame in a video clip corresponding to a first position of a playhead.
Figure 4B:
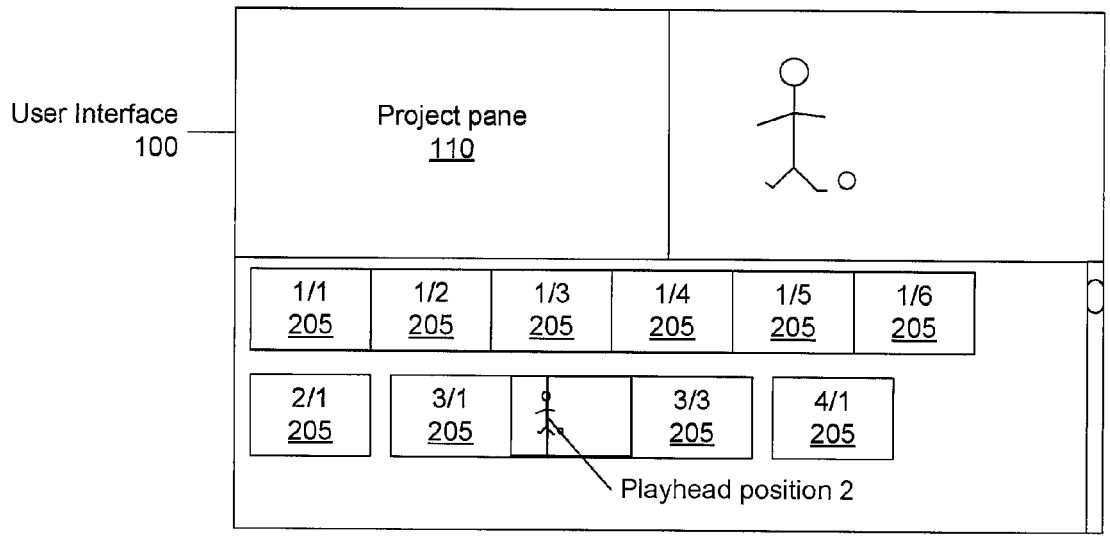
FIG. 4B is an example of a schematic of a second frame in a video clip corresponding to a second position of a playhead.
Figure 4C:
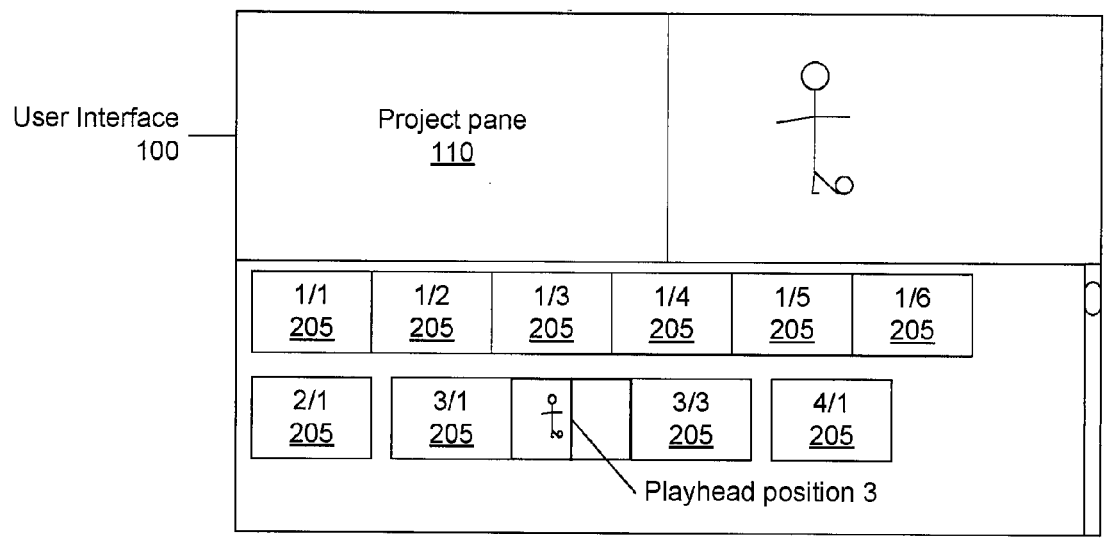
FIG. 4C is an example of a schematic of a third frame in a video clip corresponding to a third position of a playhead.
Figure 4D:
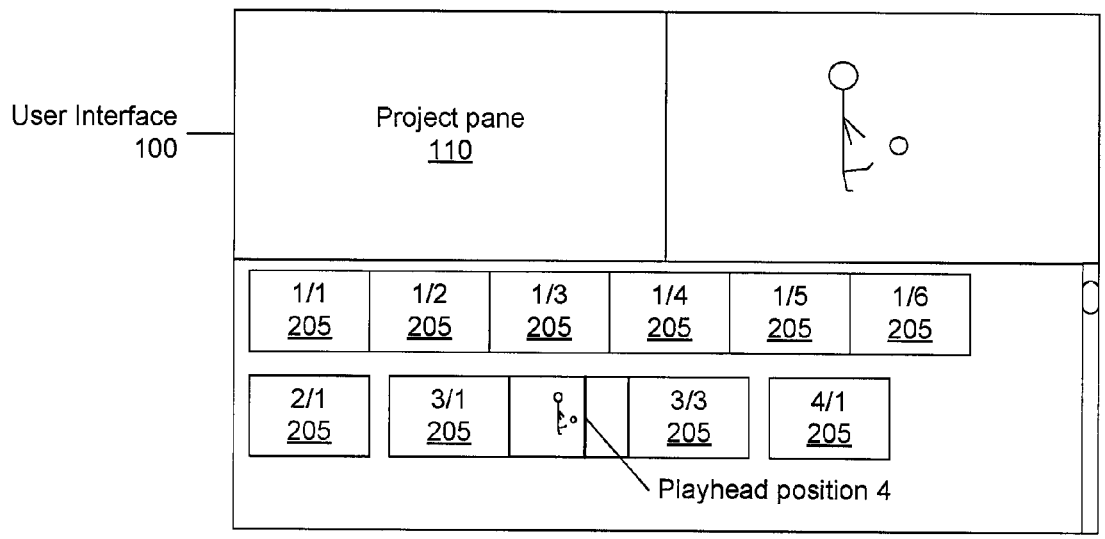
FIG. 4D is an example of a schematic of a fourth frame in a video clip corresponding to a fourth position of a playhead.
Figure 4E:
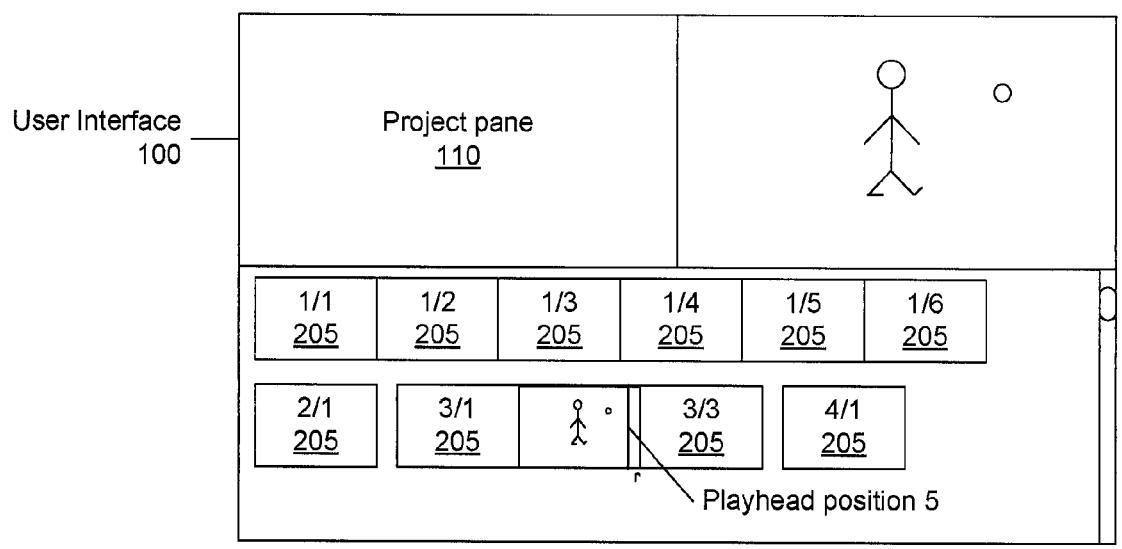
FIG. 4E is an example of a schematic of a fifth frame in a video clip corresponding to a fifth position of a playhead.

FIG. 3 depicts an example of a schematic of a user interface 100 displaying a plurality of video clips 200 as corresponding thumbnail groups 203. Each thumbnail group 203 includes one or more thumbnails 205. In some implementations, all video clips 200 of a video library can be automatically uploaded into the user interface 100 and displayed in the media pane 105 as rows of thumbnail groups 203. In other implementations, one or more video clips 200 of a video library can be selectively uploaded into the user interface 100, based on user input, and displayed in the media pane 105. The default dimensions of the user interface 100 are designated by the system. Based on the time period assigned to a thumbnail 205 and based on the duration of a video clip 200, each video clip 200 is distributed across one or more thumbnails 205 in a thumbnail group 203. In the example shown, in the default view of the user interface 100, the thumbnail groups 1, 2, 3, and 4 correspond to video clips 1, 2, 3, and 4 which are displayed across 6, 1, 3, and 1 thumbnails, respectively. If the total width of the thumbnails 205 in a row exceeds that of the media pane 105, a new row is added, and subsequent thumbnails 205 are wrapped within the media pane 105 and displayed in the following row. The size of the thumbnails in the media pane 105 and the project pane 110 can be altered proportionally based on user input.

The number of thumbnails 205 in a thumbnail group 203 to display the video clips 200 is automatically altered based on the time period assigned to each thumbnail 205. When a video clip 200 is displayed across one or more thumbnails 205 in a thumbnail group 203, the time periods corresponding to each thumbnails 205 are equal to one another, except for the last thumbnail 205 in each thumbnail group 203. The time period corresponding to the last thumbnail 205 in a thumbnail group 203 is either less than or equal to, but not greater than, the time period corresponding to other thumbnails 205 in the same thumbnail group 203. Each video clip 200 can be displayed as a single thumbnail 205 in response to user input. In such implementations, the dimensions of the thumbnails 205 corresponding to the video clips 200 are equal to one another. The duration of the video clips 200 represented by a thumbnail 205 need not be equal to one another.

When a cursor on the display device is placed over a thumbnail 205 in the user interface 100, a playhead is displayed on the display device at the position of the cursor. In some implementations, the playhead is a vertical line of height equal to the vertical dimension of the thumbnail 205. When the cursor is placed at a position away from a thumbnail 205, the playhead disappears. A user may alter the position of the cursor on the display device by operating the pointing device or the key board or both. When the playhead is positioned at a position on a thumbnail 205, a frame in the video corresponding to a time instant determined by the position of the playhead on the thumbnail is displayed in the preview pane 115. In this manner, frames related to video content displayed across one or more thumbnails in the media pane 105 and the project pane 110 can be previewed in the preview pane 115.

When the playhead is positioned on a thumbnail 205, a frame in the video clip 200 corresponding to the position of the playhead is displayed on the thumbnail 205. As the playhead is moved across the thumbnail 205, the display on the thumbnail 205 is continuously updated with the frame corresponding to the new position of the playhead. Further, the frame that is displayed on the thumbnail 205 is simultaneously displayed on the preview pane 115. As the frames displayed on the thumbnail 205 are updated as the playhead is moved, the frames displayed in the preview pane 115 are also updated.

FIGS. 4A-4E depict examples of schematics of frames in a video clip corresponding to positions of a playhead. In the examples shown, the playhead is moved horizontally across thumbnail number 2 in thumbnail group number 3. As the playhead is moved from the left of the thumbnail (playhead position 1) to the right of the thumbnail (playhead position 5), frames corresponding to the positions of the playhead are displayed in the preview pane 115. The rate at which frames are updated in the preview pane 115 corresponds to a play speed. The play speed input is provided by the user. In some implementations, a user, using a mouse as a pointing device, can move the mouse horizontally across the one or more thumbnails 205. The play speed corresponds to the speed with which the user moves the pointing device. In other implementations, the system can have one or more designated play speeds which the user can choose. Scrubbing refers to previewing the contents of one or more thumbnails 205 by moving the cursor over the thumbnail 205 in the thumbnail group 203 in forward or reverse directions. The contents of a thumbnail 205 can be scrubbed by a simple mouse over operation that does not require clicking the mouse on the thumbnail 205 to preview a frame in the preview pane 115. The time line representing progression a of video clip runs from left to right. Therefore, moving the playhead from left to right displays the frames corresponding to the position of the playhead in the preview pane 115 in the sequence in which the frames were recorded. Similarly, moving the playhead from right to left displays the frames corresponding to the position of the playhead in the preview pane 115 in the sequence opposite to that in which the frames were recorded. A user may move the playhead at a play speed placed over a thumbnail 205 using the pointing device either from the left to the right or the right to the left or both to scrub the contents of the thumbnail 205 in the preview pane 115.

As the playhead is moved across one or more thumbnails 205 at a play speed, the preview pane 115 is continuously updated with frames corresponding to the position of the playhead on the thumbnails 205. In this manner, the contents of the video clip 200 are scrubbed. The recording instrument may have a feature to record both video and audio content. Thus, the video clip can include audio content recorded along with the video content. When the contents of the video clip are scrubbed, both the video and the audio content can be played back in forward or reverse depending on the direction of movement of the playhead. In some implementations, if the play speed is less than a first threshold, both the video and audio content of the segment being scrubbed are played back. Depending on the audio features of a system, both video and the audio associated with the video are scrubbed either in forward or reverse direction depending on user input. The sequence in which the video and audio content is played back corresponds to the direction of movement of the playhead. If the play speed exceeds the first threshold, but is below a second threshold, only the video content and not the audio content, if any, is scrubbed. If the play speed exceeds the second threshold, then neither the video nor the audio associated with the video are played back. In such cases, the default view of a thumbnail 205 is displayed in the preview pane 115. The default view of a thumbnail can include any frame of the video clip including a frame in the thumbnail on which the playhead is located and a frame in any thumbnail of the video clip to which the thumbnail is related, regardless of the position of the playhead. Default view of a thumbnail is also displayed in the preview pane 115 if the direction of motion of the playhead is determined to be substantially vertical. The video content displayed in the media pane 105 can be played back and previewed in the preview pane 115 at a play speed. The user can start and stop play back at any desired position in any thumbnail displayed in the media pane 105.

Figure 5:
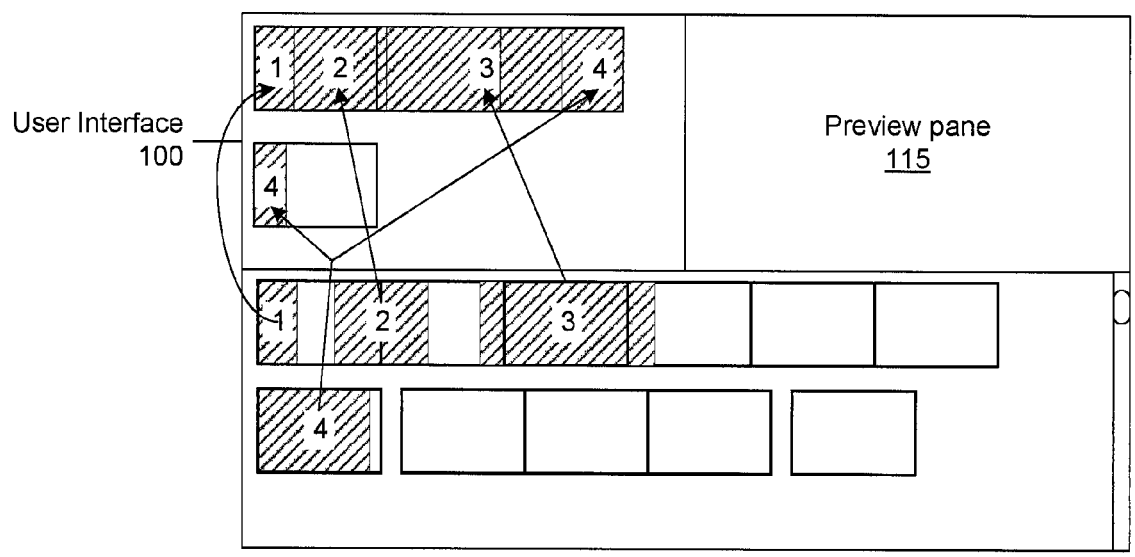
FIG. 5 is an example of a schematic of segments of video content selected from the media pane and transferred to the project pane.

From the video clips 200 uploaded in the media pane 305, a user can select segments of video and transfer the selected segments to the project pane 110. FIG. 5 depicts an example of a schematic of segments of video content selected from the media pane 105 and transferred to the project pane 110. In this manner, the user may edit the content of the raw footage displayed in the media pane 105. Content from thumbnails 205 in the media pane 105 are selected in a manner analogous to selecting text in a text editor. The playhead is placed at a desired starting position on a thumbnail 205. The user may choose the starting position on a thumbnail 205 based on the preview of a frame in the preview pane 115 obtained by placing the playhead at a position in the thumbnail 205. In some implementations, the pointing device is a mouse. The user can select the starting position on the thumbnail 205 by placing the playhead at the desired position and clicking the mouse. Subsequently, the user can move the mouse horizontally across all or segments of the thumbnail group 203 corresponding to a video clip 200 to a desired ending position. When the user clicks the mouse at the desired ending position, the segment spanned by the playhead is selected. In some implementations, the spanned segment may be displayed as a shaded rectangle that can be readily discerned. The ending position of a selected segment can be located before or after the starting position of the selected segment. The starting position and the ending position of the selected segment lie within the same thumbnail group and are related to the same video clip.

In other implementations, the user can select segments of a video clip 200 by a click and drag operation using a pointing device, for example, a mouse. In other implementations, the user can select segments of a video clip 200 by selecting the starting position and the ending position without dragging the playhead from the starting position to the ending position. For example, the user may place the playhead on the desired starting position and click the pointing device such as a mouse. The user may hold down the "Command" key on the key board, move the playhead to the desired ending position, and click the mouse at the ending position. The segments between the starting and ending position are automatically selected. Any combination of one or more keys on the key board or the pointing device or both can be designated to perform the segment selection operation.

In some implementations, the user can select segments of video from one or more thumbnails displayed on different rows in the media pane 105. The user can select a starting position and an ending position using a combination of one or more keys on the key board or the pointing device or both such that the starting position is located on a row different from the ending position. All the content between the starting position and the ending position, regardless of the rows on which the starting and ending position are located, can be selected. In some implementations, the user can select a plurality of segments from among the video clips 200 displayed in the media pane 105. Each segment can have a starting position and an ending position. For example, the user can select a first segment of a video clip 200 by clicking the mouse at a starting position and dragging the mouse to an ending position. Alternatively, the user can select a first segment by clicking the mouse at the starting position, holding down a key on the key board, for example, the "Command" key, and clicking the mouse at the ending position. Subsequently, the user can hold down a second key on the key board, for example, the "Shift" key, and repeat the process for selecting a segment at a different position in the media pane 105. In this manner, the user can select multiple segments of the video clip 200 from the media pane 105, wherein each selected segment has a starting position and ending position.

One or more selected segments of the one or more video clips 200 can be transferred from the media pane 105 to the project pane 110. In some implementations, a segment of video selected in the media pane 105 can be transferred to the project pane 110 without clicking the pointing device, for example, a mouse, on the selected segment. Placing the pointing device at any point in the selected segment allows moving the entire selected segment to the project pane 110 without clicking the pointing device at any point in the selected segment. In other implementations, the selected segments can be dragged from the media pane 105 and dropped into the project pane 110 in a manner similar to text editing. In other implementations, the selected segments can be cut from the media pane 105 and pasted into the project pane 110 in a manner similar to text editing. In such implementations, when the selected segments are transferred from the media pane 105 to the project pane 110, the selected segments may be removed from display in the media pane 105. In other implementations, the selected segments can be copied and the copied segments can be pasted into the project pane 110. In such implementations, the selected segments continue to be displayed in the media pane 105 as well as the project pane 110.

Each selected segment can be transferred individually from the media pane 105 to the project pane 110. Alternatively, one or more selected segments can be transferred simultaneously to the project pane 110. The transferred segments are displayed as a corresponding thumbnail group. A thumbnail group corresponding to a transferred segment includes one or more horizontal rows of thumbnails, wherein the height of each thumbnail is equal to one another. The number of thumbnails across which a transferred segment is displayed depends on a time assigned to each thumbnail and can be altered by a user. Segments transferred first appear as thumbnails on the left end of a row in the project pane 110. Segments transferred subsequently are displayed as one or more thumbnails to the right of the one or more thumbnails related to segments already present in the project pane 110. The segments are separated by a system designated space to distinguish between segments. A segment can be inserted at any position in a row including the start of the row, the end of the row, or any position in between. All transferred segments are separated by a system designated distance. If the width of the thumbnails exceeds the width of the project pane 110, a new row is added to the project pane and subsequent segments are transferred to the new row. The size of the thumbnails in the project pane 110 can be altered along with the size of the thumbnails in the media pane 105 by varying the position of an interactive scale that is configured to alter the vertical and horizontal dimensions of the thumbnails.

The selected segments of the video clip displayed in the project pane 110 can be re-arranged based on user input. In some implementations, a user can change the position of a selected segment by placing the pointing device, for example, a mouse, anywhere on the selected segment, moving the selected segment from its present position, and placing the selected segment at a desired position. The entire selected segment can be moved regardless of the point in the selected segment where the mouse is located. A first selected segment can be dragged and dropped to positions including the start of a second segment, the end of a second segment, the start of a row, and the end of a row. The contents of the segments selected by the user, transferred to the preview pane 110, and displayed in a sequence desired by the user can be scrubbed by moving the playhead. In a manner similar to scrubbing the contents of thumbnails in the media pane 105, the contents in the preview pane 110, including audio, can be previewed in the preview pane 110 based on the speed of movement of the playhead. In addition, the contents of the transferred segments can be played back as a continuous video clip. The contents of the segments in the project pane 110 can be played back and previewed in the preview pane 115. The user can start and stop play back at any desired position in any thumbnail displayed in the project pane 110.

The video content displayed in the media pane 105 and the project pane 110 is aligned relative to a time line. In some implementations, a user can add and associate overlay content, including audio tracks, voice-overs, titles, and transitions between frames in the video, to the video content displayed in the project pane 110. The user can add overlay content at any position in the project pane 110 and anchor a point in the overlay content to a point in the video content displayed in the project pane 110 such that the point in the additional content is played back at the same instant as the anchored point in the video content, regardless of the time in the time line when the point in the video content is played back. In this manner, the play back of a first point in the overlay content can be synchronized to a second point in the video content. In some implementations, when the user includes overlay content into the content displayed in the project pane 110, the overlay content is displayed as a horizontal bar beneath the thumbnail group 203 corresponding to the video content to which the overlay content is associated. Any point in the overlay content can be synchronized to any point in the video content in the project pane 110. The display of a horizontal bar beneath a thumbnail 205 is an indication of overlay content.

Figure 6:
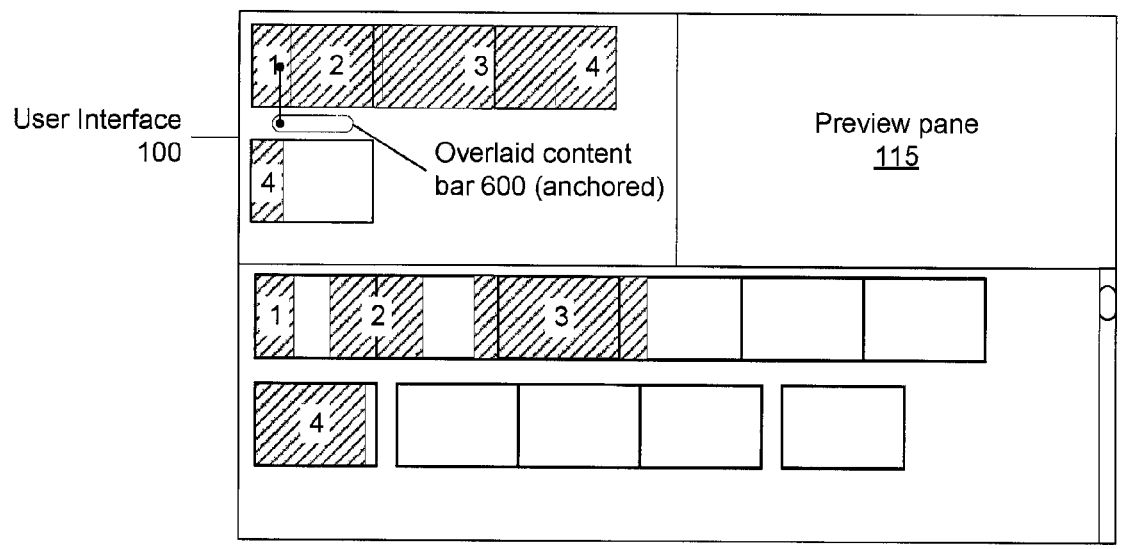
FIG. 6 is an example of overlay content anchored to video content in a project pane.

The overlay content, for example, an audio track, is anchored to a specific point in the video content. FIG. 6 depicts an example of overlay content anchored to video content in a project pane 105. The user may anchor the overlay content to a specific position in the video content so that the anchored point in the overlay content plays back whenever the corresponding anchored point in the video content plays back, regardless of the time instant when the rest of the video content and the overlay content plays back. In some implementations, the user can choose a first point in the video content and then choose the overlay content. The starting point in the overlay content is automatically anchored to the first point. In other implementations, when the user adds overlay content to a thumbnail related to video content in the project pane 110, the overlay content is automatically anchored to the first frame in the first thumbnail in the thumbnail group. Subsequently, the user can relocate the anchored point in the overlay content and the anchored point in the video content to any desired point using the pointing device. The user can relocate the anchored point in the video content based on a preview of a frame related to a thumbnail displayed in the project pane 110 viewed in the preview pane 115. In some implementations, the anchored points in the video and audio content are displayed as points connected by a vertical line. In such implementations, regardless of additions to, deletions from, or re-arrangements of the video content in the project pane 110, the position of the anchored point in the overlay content relative to the anchored point in the video content remains unaltered. The overlay content before and after the anchored point is automatically adjusted such that the point in the overlay content plays back at the same time instant as the point in the video content to which it is anchored.

In some implementations, the overlay content is a voice-over that a user can add to the video content. The user can select a point in the video content displayed in the project pane 310 as the starting point of the voice over. The user can record audio for a desired time period. The user can select an ending point for the end of the voice over. The starting point of the voice over is anchored to the chosen starting point in the video content. The user can independently move the anchored point in the video content and the anchored point in the voice-over to any desired point second point in the thumbnail group representing the video content and the horizontal bar representing the voice over, respectively.

In some implementations, the overlay content can include transitions between frames. The system can include a plurality of transition styles. In some implementations, the user can choose and insert a transition style between two frames. The transition can appear as a rectangular thumbnail with vertical dimension equal to the vertical dimension of the thumbnails representing the selected segments. The horizontal dimension of the thumbnail representing a transition can be varied based on user input. The user can alter the duration of the transition by altering the horizontal dimension of the thumbnail representing the transition. In this manner, the user can edit the raw footage recorded using the recording instrument and add features to the edited video clip. Subsequently, the user can store the edited video clip on a storage device. The storage device may be the storage device on which the raw footage is stored. Alternatively, the storage device may be a separate device.

Figure 7:
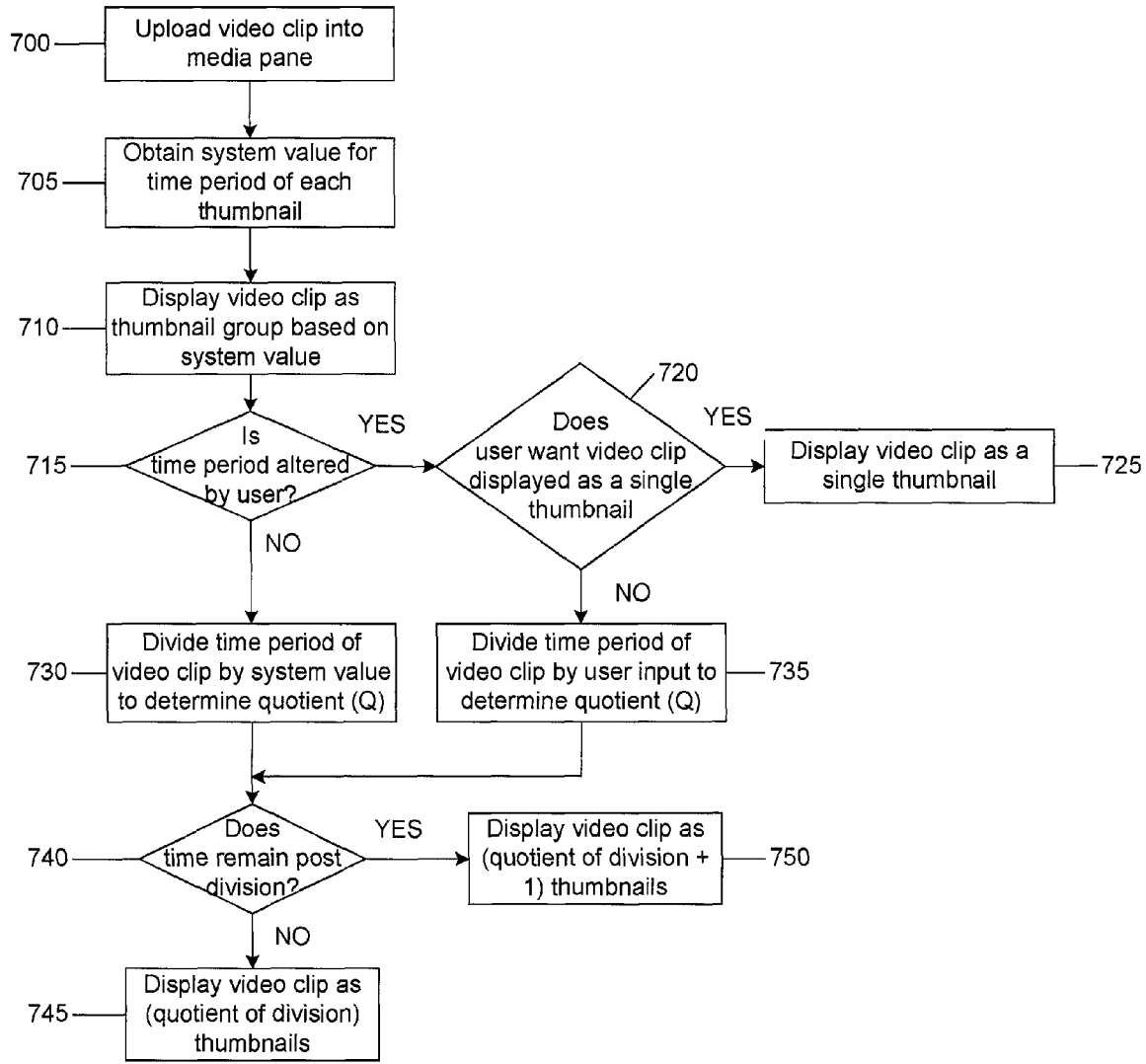
FIG. 7 is an example of a flow chart of a method of displaying video clips as a series of one or more thumbnails in a thumbnail group.

FIG. 7 depicts an example of a flow chart of a method of displaying video clips 200 as a series of one or more thumbnails 205 in a thumbnail group 203. In some implementations, the video clips 400 are uploaded into the media pane 305 at 700. The system 100 assigns a default time period for each thumbnail 205. This system value for each thumbnail 205 is obtained at 705. The video clip 200 is displayed as a thumbnail group 203 based on the duration of the video clip 200 and the system value for time period of a thumbnail 205 at 710. The thumbnail group 203 can include one or more thumbnails 205. A user can alter the time period assigned to each thumbnail 205. If the time period for each thumbnail 205 is altered by a user (715), the user specified time is used to determine the number of thumbnails 205 in the thumbnail group 203. If not, then the system assigned value is used to determine the number of thumbnails 205 in the thumbnail group 203. If the user specifies an input to display each video clip 200 as a single thumbnail 205 (720), each video clip 200 is displayed as a single thumbnail 205 at 725. If the user does not specify a time period for a thumbnail 205, then the duration of the video clip 200 is divided by the system assigned value for time period of a thumbnail 205 and a quotient of the division (Q) is determined at 730. If the user specifies a time period for a thumbnail 205, then the duration of the video clip 200 is divided by the user specified value and a quotient of the division (Q) is determined at 735. If no time remains post division (740), the video clip is displayed across Q thumbnails at 745. The thumbnail group 203 includes Q thumbnails 205. If time remains post division (740), the video clip is displayed across (Q+1) thumbnails at 750. The thumbnail group 203 includes (Q+1) thumbnails 205.

The display of segments of video content transferred from the media pane 105 to the project pane 110 and the number of thumbnails 205 in the thumbnail group 203 representing the segment can also be altered based on the duration of a segment and a time period assigned to each thumbnail in the project pane 110. A user can transfer segments of video of any time period from the media pane 105 to the project pane 110. The time period assigned to each thumbnail in the project pane 110 is assigned a default system value which can be altered based on user input. The number of thumbnails required to display a transferred segment as a thumbnail group is a function of the duration of the segment and the time period assigned to each thumbnail. The time period assigned to a thumbnail in the media pane 105 can be altered independently from the time period assigned to a thumbnail in the project pane 110.

Figure 8:
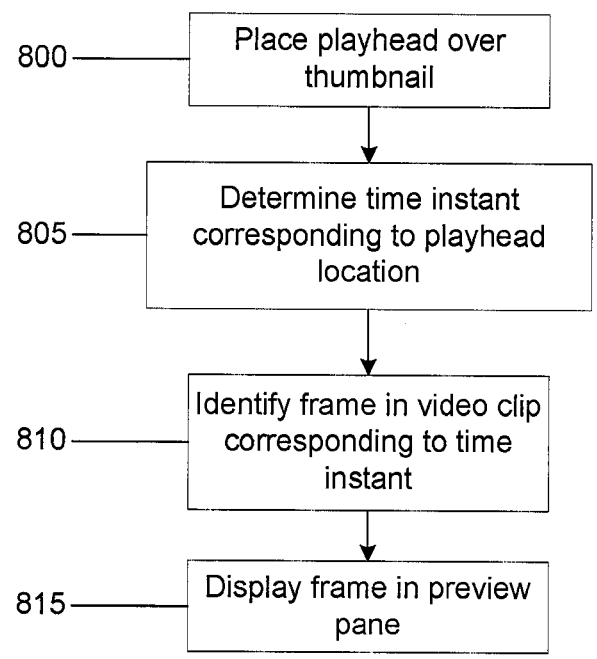
FIG. 8 is an example of a flow chart of a method of previewing a frame corresponding to a time instant in a video clip.

FIG. 8 depicts an example of a flow chart of a method of previewing a frame corresponding to a time instant in a video clip 200. The video clip 200 may be displayed as one thumbnail 205 or a horizontal sequence of a plurality of thumbnails 205 in a thumbnail group 203. A cursor on the display device can be controlled by the key board or the pointing device or both. The cursor is placed on a thumbnail 205 related to a video clip 200 at 800, wherein the cursor is displayed as a playhead. The time instant in the video clip 200 corresponding to the position of the playhead on the thumbnail 205 is determined at 805. A frame in the video clip 200 corresponding to determined the time instant is identified at 810. The identified frame is displayed in the preview pane 115 at 815.

Figure 9:
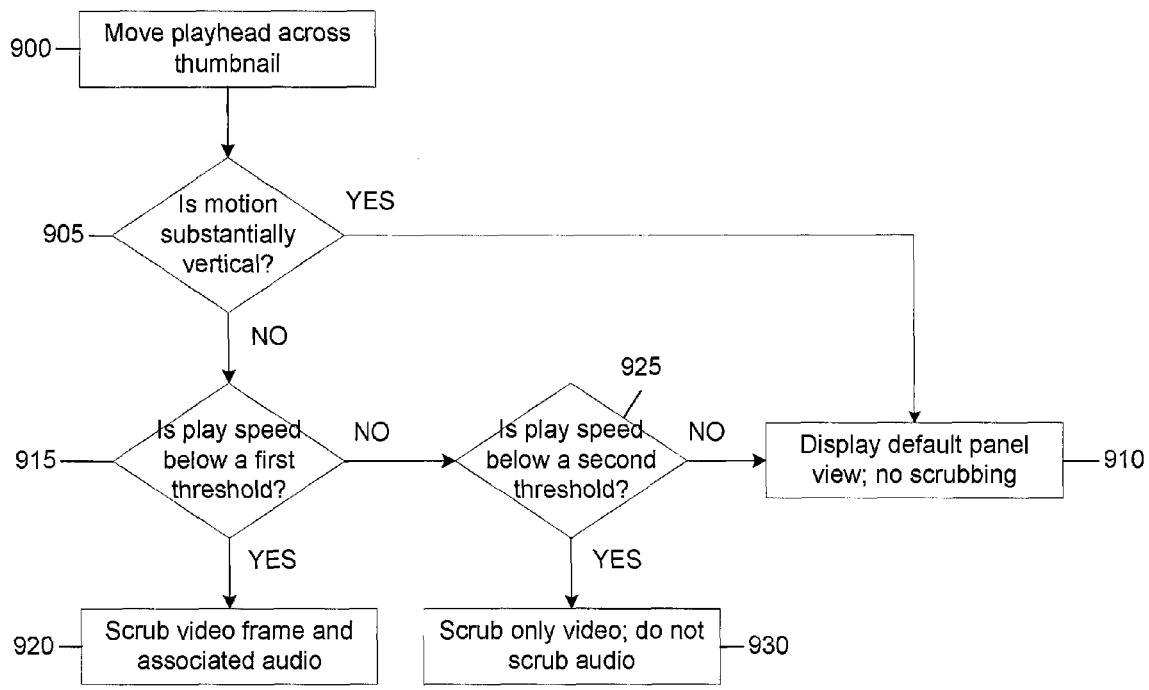
FIG. 9 is an example of a flow chart of a method of scrubbing based on a play speed.

FIG. 9 depicts an example of a flow chart of a method of scrubbing based on a play speed of a playhead. The playhead can be controlled using the key board or the pointing device or both. By moving the playhead across one or more thumbnails, the frames corresponding to the positions of the playhead are displayed in the preview pane 115, and can, thus, be scrubbed. The play speed with which the playhead is moved across a thumbnail 205 is determined at 900. If the direction of motion of the playhead is substantially vertical, then the frames in the thumbnail 205 are not scrubbed. A default view of the thumbnail 205 is displayed in the preview pane 115 at 910. If the play speed is determined to not be substantially vertical, the play speed is compared with a first threshold at 915. If the play speed is less than the first threshold, both video and audio content corresponding to the position of the playhead are scrubbed (920). If the play speed is greater than the first threshold, then the play speed is compared with a second threshold at 925. If the play speed is greater than the first threshold and lesser than a second threshold, then only the video content of the frame is scrubbed at 930. The audio content associated with the frame is not scrubbed. If the play speed is greater than the second threshold, then the play speed is deemed too fast to update frames in the preview pane and the default view is displayed. Neither the video nor any other associated content is scrubbed. The default view can be any frame including the starting frame of the thumbnail 205, the ending frame of the thumbnail 205, the starting frame of the thumbnail group 203 representing the video clip 200, and the ending frame of the thumbnail group 203 representing the video clip 200.

Figure 10:
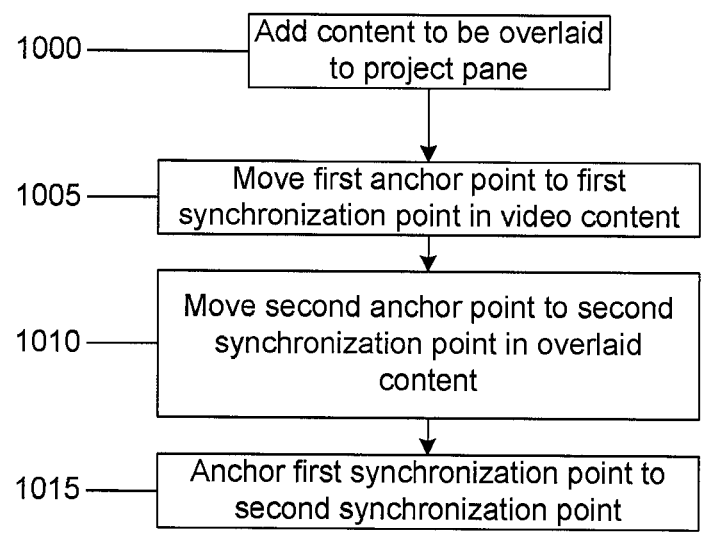
FIG. 10 is an example of a flow chart of a method of synchronizing overlay content to video content.

FIG. 10 depicts an example of a flow chart of a method of synchronizing overlay content to video content. The overlay content is overlaid on the video content displayed in the project pane 110. Based on user input, the content to be overlaid is added to the project pane 110 at 1000. The overlay content includes one or more of audio tracks, voice-overs, titles, transitions between video, and combinations of the three. In some implementations, the overlay content is displayed in the project pane 110 as a horizontal bar in the gutter between rows of thumbnail groups 203 representing video content. The user can synchronize a first point in the overlay content to play back whenever a second point in the video content is played back. In some implementations, the user picks a first point on a thumbnail 205. The user then adds the overlay content. The starting point of the overlay content is automatically anchored to the first point in the thumbnail. In other implementations, the user adds the overlay content to a thumbnail in the project pane 110. The starting point of the overlay content is automatically anchored to the starting point of the thumbnail to which the overlay content is added. The anchor is displayed as two points, each located on the video content and the overlay content, connected by a vertical line. Based on user input, the first anchor point is moved to a first synchronization point at 1005. Similarly, based on user input, the second anchor point in the overlay content is moved to a second synchronization point at 1010. The first synchronization point is anchored to the second synchronization point at 1015. Once anchored, the second synchronization point in the overlay content always plays back at the same time as the first synchronization point in the video content to which it is anchored, regardless of additions to or deletions from the video content and the overlay content. The anchor points on the video content and the overlay content can be moved using the pointing device or the key board or both.

Figure 11:
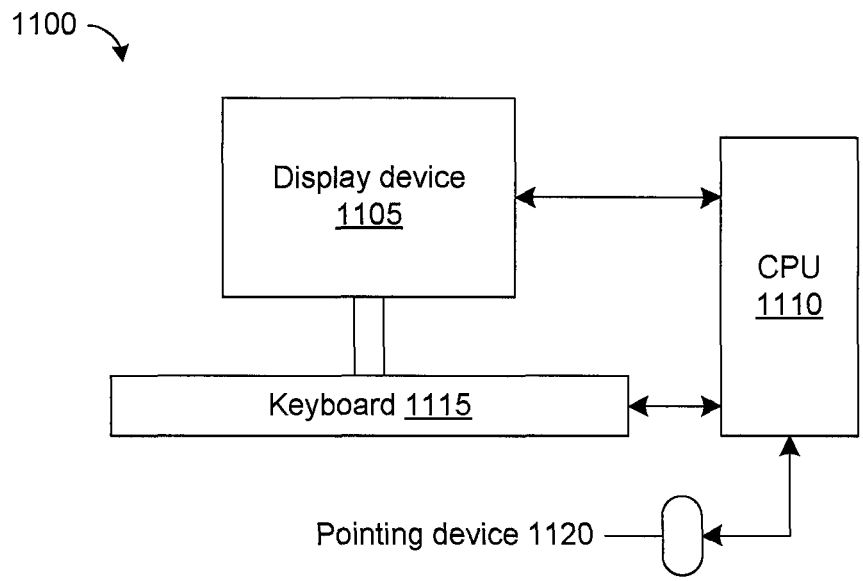
FIG. 11 is an example of a schematic of a system on which the video editing software is implemented.

FIG. 11 depicts an example of a schematic of a system in which the video editing software is implemented. The system 1100 includes a display device 1105, a central processing unit (CPU) 1110, a key board 1115, and a pointing device 1120. The software can be implemented in virtually any suitable system 1100 (e.g., desktop computer, laptop computer, personal digital assistant (PDA), smartphone, work station). Information can be displayed to a user using any suitable display device 1105 including a cathode ray tube (CRT) and liquid crystal display (LCD) monitor. A user can use a key board 1115 and virtually any suitable pointing device 1120 (e.g., mouse, track ball, stylus, touch screen) to interact with the video editing software. The display device 1105, the key board 1115, and the pointing device 1120 can be operatively coupled with the CPU 1110 through wired or wireless means.

In some implementations, the software can be installed on a CPU 1110 controlled by an operating system such as Macintosh Operating System (Mac OS) X v10.0. In other implementations, the software can be installed on a CPU 1110 controlled by other operating systems including Microsoft Windows, UNIX, and Linux. In some implementations, the system 1100 is a stand alone device such as a desktop computer. In other implementations, the system 1100 is a network where the software is installed in a centralized server and a user can access the software through one or more nodes such as work stations.

Figure 12:
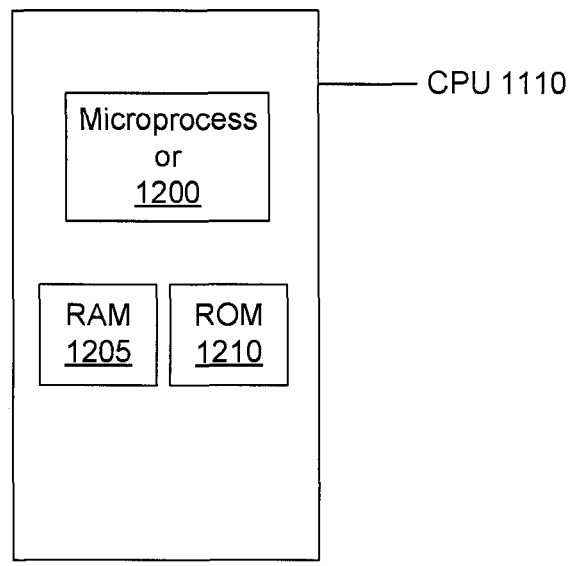
FIG. 12 is an example of a schematic of a central processing unit.

FIG. 12 depicts an example of a schematic of a central processing unit 1110. The CPU 1110 includes a microprocessor 1200, a random access memory (RAM) 1205, and a read only memory (ROM) 1210. When a user runs the video editing software application installed on a system 1100, the user provides instructions to the CPU 1110 using one or more of the input devices including the keyboard 1115 and the pointing device 1120. The microprocessor 1200 performs the operations specified by the user based on user input and instructions from RAM 1205 or ROM 1210 or both. The system 1100 displays the output on the display device 1105. In addition, the CPU 1110 can include a storage device to store content including raw footage recorded using the recording instrument, edited video, and additional content. In some implementations, the storage device resides in the CPU 1110. In other implementations, the storage devices resides external to the CPU 1110. In other implementations, the storage device resides in the recording instrument. The recording instrument is operatively coupled to the CPU 1110 through wired or wireless means to retrieve stored content.

Although a few implementations have been described here, other modifications are possible. For example, the video editing software can be embedded into the recording instrument. The display device on which the recorded content is played back can be used to display the user interface 100 including the media pane 105, the project pane 110, and the preview pane 115. A user can use a pointing device 1120 including a stylus and a touch screen to scrub across thumbnails in the media pane 105, select segments of video from the thumbnails in the media pane and 105 and transfer the selected segments to the project pane 110. Preview of the content in the thumbnail groups 203 displayed in the media pane 105 or the segments of video content in the project pane 110 or both can be viewed in the preview pane 115. Additional content to be laid over the video content in the project pane 110 can be stored in a storage device located in the recording instrument. Alternatively, the content to be overlaid can be stored in a separate storage device that can be operatively coupled to the recording instrument.

In some implementations, more than one user interface 100 can be opened and viewed simultaneously. For example, video clips 200 in a first video library can be uploaded into a first media pane 105 in a first user interface 100. Video clips in a second video library can be uploaded into a second media pane 105 in a second user interface 100. The video clips from the first media pane 105 can be selected and transferred to the second media pane 105, and vice versa, by operations similar to text editing including drag and drop, cut and paste, and copy and paste. The time period of the one or more thumbnails 205 related to a video clip 200 in the first media pane 105 need not be the same as the time period of the one or more thumbnails related to a video clip 200 in the second media pane 105. When a video clip 200 is transferred from the first media pane 105 to the second media pane 105, the one or more thumbnails 205 related to the transferred video clip 200 can be automatically assigned the time period of the one or more thumbnails 205 in the second media pane 105, and vice versa. Segments of video selected in the first media pane 105 in the first user interface 100 can be selected and transferred to the second project pane 110 in the second user interface 100 by operations similar to text editing including drag and drop, cut and paste, and copy and paste, and vice versa. Video segments can be selected and transferred from the first project pane 105 to the second project pane 105, and vice versa. The video content in the media pane 105 and project pane 110 in the user interface 100 can be previewed in the preview pane 115 in the corresponding user interface 100. The user interfaces 100 can be displayed as a cascade on the display device 1105, wherein each user interface 100 can be independently accessed, viewed, and re-sized, based on user input.

In another implementation, more than one media pane 105 can be opened and viewed in the same user interface 100. For example, video clips in a first video library can be uploaded into a first media pane 105 in a user interface 100. A second media pane 105 can be opened in the same user interface 100 and video clips in a second video library can be uploaded into the second media pane 105. Video clips 200 can be selected from the first media pane 105 and transferred to the second media pane 105, and vice versa, by operations similar to text editing including drag and drop, cut and paste, and copy and paste. The time period assigned to the one or more thumbnails 105 related to a video clip 200 transferred from a first media pane 105 to a second media pane 105 in the same user interface 100 can be automatically adjusted to correspond to the time period assigned to the thumbnails 205 in the second media pane 105. The video content in the first media pane 105 and the second media pane 105 can be previewed in the same preview pane 115 in the user interface 100. Segments of video content from the first media pane 105 and the second media pane 105 can be selected and transferred to the same project pane 110 by operations similar to text editing including drag and drop, cut and paste, and copy and paste.

In another implementation, more than one project pane 110 can be opened and viewed in the same interface 100. Segments of video from the same media pane 105 or different media panes 105 can be selected and transferred to a first project pane 110 and a second project pane 110. Segments of video can also be transferred between two project panes 110. The content of each project pane 105 can be saved as a separate finished project. In this manner, a user can work on one or more projects simultaneously.

In some implementations, the panes of a user interface 100 can be displayed on the display device 1105 as disconnected from each other. The media pane 105, the project pane 110, and the preview pane 115 can be displayed as separated from each other on the display device 1105. Each pane can be independently accessed, moved, and resized, based on user input. Although the panes are displayed as disconnected, selecting segments from the media pane 105, transferring segments to the project pane 110, and preview of video in the media pane 105 or the project pane 110 in the preview pane 115 can remain unaffected. Based on user input, two or more panes can be reconnected.

In some implementations, the media pane 105 can occupy the right half of the user interface and the project pane 110 and the preview pane 115 can occupy the left half, or vice versa. The one or more video clips 100 can be displayed in the media pane 105 as columns of thumbnail groups 203. The playhead can be displayed as a horizontal bar that appears when the cursor on the display device 1105 is placed over a thumbnail. Frames in the thumbnail groups 203 can be previewed by scrubbing the playhead vertically over one or more thumbnails 205.

In some implementations, when one or more video clips 200 are uploaded into a media pane 105 and displayed as one or more thumbnails 205, the title under which each video clip 200 is stored in the storage device can appear adjacent to the video clip 200. Further, depending on the number of thumbnails 205 across which each video clip 200 is distributed, thumbnail numbers may appear adjacent to each thumbnail 205. In other implementations, additional data representative of the one or more video clips 200 may appear in the media pane 105.

In some implementations, when a segment of video content displayed in one or more thumbnails 205 in the media pane 105 is selected, the selected segment can be removed from display in the media pane 105. Alternatively, all segments of a thumbnail except the selected segment can be removed from display in the media pane 105. A user can provide input to permanently delete the removed segments from the raw footage. Similarly, segments displayed in the project pane 110 can also be removed from display.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   displaying a first region representing video content within a user interface in a digital media system, the video content aligned relative to a time line;
   detecting a first selection of a first position in the first region, wherein the first position represents a frame of the video content, and further wherein a first graphical indicator is displayed at the first position;
   displaying a second region representing overlay content adjacent to the first region, the overlay content aligned relative to the time line;
   detecting a second selection of a second position in the second region, wherein the second selection represents a portion of the overlay content, and further wherein a second graphical indicator is displayed at the second position;
   synchronizing the frame of the video content to the portion of the overlay content such that the overlay content plays back starting at the second position at an instant when the video content plays back starting at the first position; and
   displaying a connection between the first graphical indicator and the second graphical indicator.

2. The method of claim 1, wherein synchronizing comprises synchronizing the video content represented by the first position and the overlay content represented by the second position to a same instant in the time line.

3. The method of claim 1, wherein the second position in the second region represents a starting point of the overlay content.

4. The method of claim 3, further comprising performing editing operations on the synchronized portion of the video content and the portion of the overlay content, wherein the editing operations comprise removing a portion of the video content, adding new video content, and re-arranging a sequence of the video content.

5. The method of claim 1, further comprising detecting input to change the position in the first region.

6. The method of claim 1, further comprising detecting input to change the second position in the second region.

7. The method of claim 1, wherein the overlay content comprises one or more of an audio track, a title, a voice-over, and a transition between frames in the video content.

8. The method of claim 1, wherein the second region representing the overlay content is displayed as a horizontal bar adjacent to first region representing the video content.

9. The method of claim 8, wherein displaying the connection between the first position and the second position comprises:
   displaying the horizontal bar below the first region; and
   displaying a vertical line connecting the first position and the second position in the horizontal bar.

10. A medium bearing instructions to enable one or more machines to perform operations comprising:
    displaying a first region representing video content within a user interface in a digital media system, the video content aligned relative to a time line;
    detecting a first selection of a first position in the first region, wherein the first position represents a frame of the video content, and further wherein a first graphical indicator is displayed at the first position;
    displaying a second region representing overlay content adjacent to the first region, the overlay content aligned relative to the time line;
    detecting a second selection of a second position in the second region, wherein the second selection represents a portion of the overlay content, and further wherein a second graphical indicator is displayed at the first position;
    synchronizing the frame of the video content to the portion of the overlay content such that the overlay content plays back starting at the second position at an instant when the video content plays back starting at the first position; and
    displaying a connection between the first graphical indicator and the second graphical indicator.

11. The medium of claim 10, wherein synchronizing comprises synchronizing the video content represented by the first position and the overlay content represented by the second position to a same instant in the time line.

12. The medium of claim 10, wherein the second position in the second region represents a starting point of the overlay content.

13. The medium of claim 12, the operations further comprising performing editing operations on the synchronized portion of the video content and the portion of the overlay content, wherein the editing operations comprise removing a portion of the video content, adding new video content, and re-arranging a sequence of the video content.

14. The medium of claim 10, the operations further comprising detecting input to change the position in the first region.

15. The medium of claim 10, the operations further comprising detecting input to change the starting position in the second region.

16. The medium of claim 10, wherein the overlay content comprises one or more of an audio track, a title, a voice-over, and a transition between frames in the video content.

17. The medium of claim 10, wherein the second region representing the overlay content is displayed as a horizontal bar adjacent to first region representing the video content.

18. The medium of claim 8, wherein displaying the connection between the first position and the second position comprises:
    displaying the horizontal bar below the first region; and
    displaying a vertical line connecting the first position and the second position in the horizontal bar.

19. A computer-implemented method comprising:
receiving a first input to display video content within a user interface in a digital media system, wherein the video content includes a starting position;
in response to receiving the first input:
displaying a first region representing the video content within the user interface, and
aligning the video content relative to a time line;
receiving a second input to display overlay content within the user interface in the digital media system:
in response to receiving the second input:
displaying a second region representing the overlay content below the first region within the user interface; and
receiving a third input representing a starting position of the overlay content, wherein the starting position of the overlay content represents a position in the overlay content;
aligning the overlay content relative to the time line:
in response to receiving the third input:
synchronizing the starting position of the overlay content to the starting position of the video content such that the overlay content plays back at a same time instant that the video content plays back, and
displaying a connection between the starting position of the video content and the starting position of the overlay content.

20. The method of claim 19, further comprising:
receiving a fourth input to relocate the starting position of the overlay content to a different position in the overlay content; and
in response to the fourth input:
synchronizing the starting position of the video content to the different position in the overlay content,
hiding the connection between the starting position of the video content and the starting position of the overlay content, and
displaying another connection between the starting position of the video content and the different position in the overlay content.

21. The method of claim 19, wherein displaying the connection between the starting position of the video content and the starting position of the overlay content comprises:
displaying the first region and the second region such that the starting position of the video content directly above the starting position of the overlay content; and
displaying a vertical line connecting the starting position of the video content directly and the starting position of the overlay content.

* * * * *